May 18, 1926.
R. B. DEEMS
STUFFING BOX
Filed Dec. 26, 1924
1,585,087
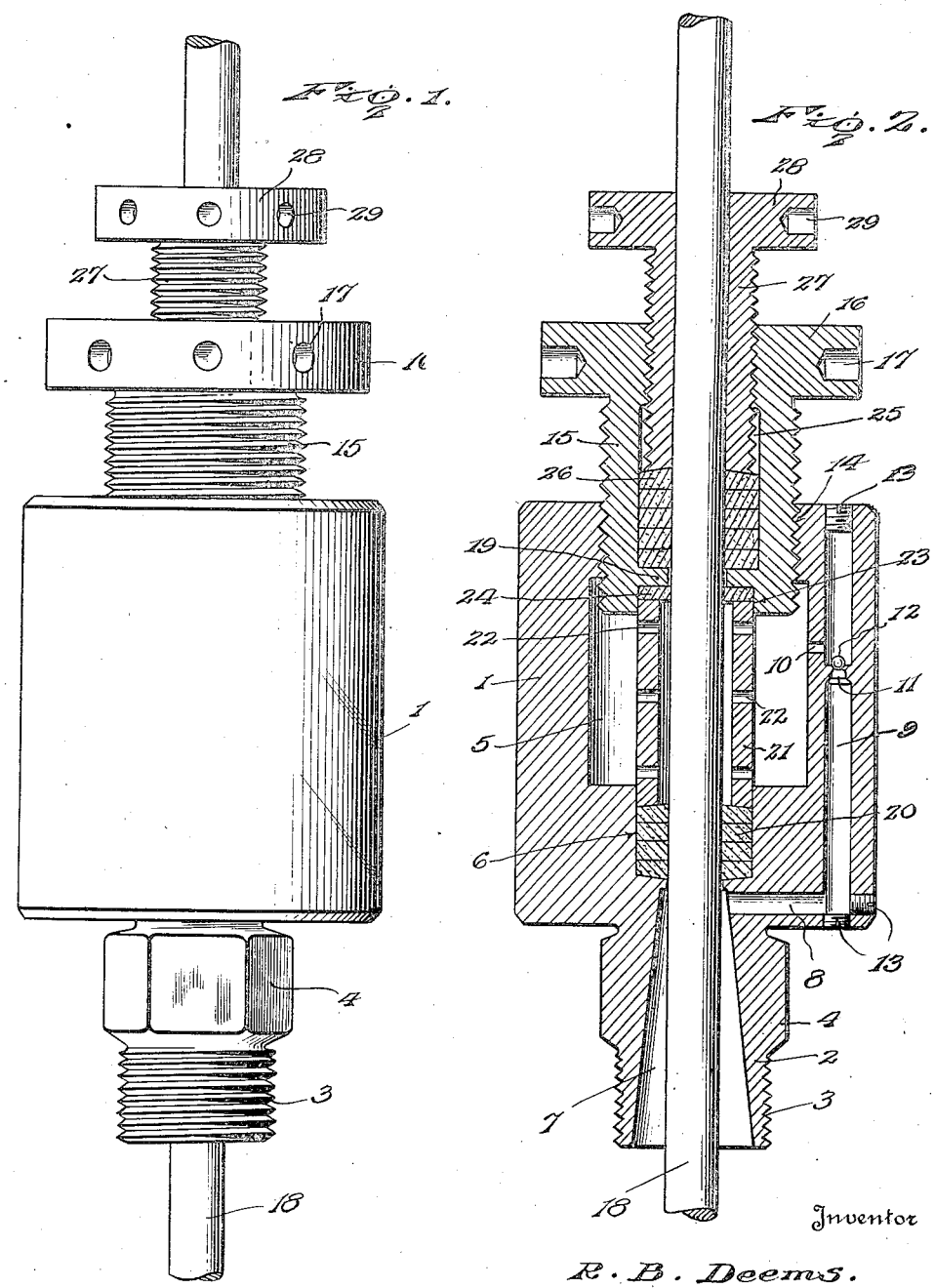
Inventor
R. B. Deems.
By Lacey & Lacey, Attorneys Patented May 18, 1926.

1,585,087

UNITED STATES PATENT OFFICE.

RALPH BURTRON DEEMS, OF WICHITA FALLS, TEXAS, ASSIGNOR, BY MESNE ASSIGNMENTS, OF FORTY-NINE PER CENT TO H. A. VAN TASSEL.

STUFFING BOX.

Application filed December 26, 1924. Serial No. 758,216.

This invention relates to stuffing boxes and is intended more particularly for use upon deep well pumps, the primary object of the invention being to provide a novel structure by the use of which a portion of the liquid which is raised from the well will be diverted to lubricate the plunger rod and maintain the packing in a soft pliable condition whereby it will serve efficiently to prevent leakage and to keep the plunger rod cool as well as to prevent scoring of the same. The invention seeks to provide a stuffing box of such construction that the packing employed may be easily and effectually compressed around the plunger rod and will be readily accessible so that it may be easily renewed when necessary. The invention is illustrated in the accompanying drawing and will be hereinafter fully set forth and defined.

In the drawing:

Figure 1 is an elevation of my improved stuffing box, and

Fig. 2 is a central vertical longitudinal section of the same.

In carrying out my invention, I employ a main body or box 1 which is substantially cylindrical in form and is provided at its lower end with a nipple 2 externally threaded, as at 3, at its lower extremity whereby it may be easily secured in the pump casing, the nipple being further provided above the threaded extremity with flat faces 4 whereby it may be engaged by a wrench or other turning tool so as to be turned home in the pump casing or other element upon which the stuffing box is mounted. The interior of the box 1 is laterally expanded to provide a central chamber 5 and in the bottom wall of the said chamber is a recess 6, the bore of the box opening from the bottom of said recess and being flared, as shown at 7, below the same so as to facilitate the flow of some of the water or oil into the box. Leading laterally from the upper end of the flared portion 7 is a channel or passage 8 which communicates with a vertical passage or channel 9 formed in the wall of the box or bottom 1 and extending longitudinally of the same, the passages 8 and 9 constituting a by-pass which communicates through a port 10 with the chamber 5. Immediately below the port 10, a valve seat 11 is provided in the passage 9 and a ball valve 12 is adapted to cooperate with said seat so that the liquid which may enter the chamber 5 will be retained therein and prevented from draining back through the by-pass passage. The passages 8 and 9 may be formed in the box by any approved method and may be conveniently formed by boring, the ends of the bores being closed by plugs 13, as will be understood.

In the upper end of the box or body 1 is a central threaded opening 14 which opens into the chamber 5 and is adapted to receive an externally threaded gland 15, the said gland being provided with an enlarged annular head or flange 16 at its upper end which is constructed with sockets 17 in its edge whereby it may be engaged by a spanner or similar tool to be turned home in the opening 14. The plunger rod, a portion of which is shown at 18, is, of course, inserted axially through the stuffing box and the gland 15 is provided adjacent its lower end with an internal annular partition 19, the bore or central opening of which is slightly greater in diameter than the plunger rod so that, when the parts are assembled, there will be no contact between the rod and the partition.

In the lower end of the recess 6, packing 20 is placed and this packing may be of hemp, asbestos, rubber or any of the other materials now generally employed for the purpose. The packing is illustrated in the form of superposed disks which fit closely within the recess 6 and are adapted to hug the plunger rod. Resting upon the packing 20 with its lower end received in the upper end of the recess 6 is a sleeve 21 of metal or other durable strong material having radial holes 22 formed through its wall. The internal diameter of the sleeve 21 is greater than the diameter of the plunger rod so that there will be no contact between the sleeve and the rod and an appreciable space will be left to receive the liquid which enters the chamber 5 so that the plunger rod will be thoroughly lubricated and kept cool. The upper end of the sleeve 21 fits closely within a recess 23 in the lower end of the gland 15 and, between the upper end of the sleeve and the partition 19, a washer or packing disk 24 is fitted within the said recess 23. It will be readily understood that, when the gland 15 is turned home, the packing 24 will be compressed against the end of the sleeve 21 and the pressure applied to the sleeve will be transmitted to the packing 20 which, in turn, will be compressed around the plunger rod between the lower end of the sleeve and the bottom of the recess 6.

Within the bore 25 of the gland 15 above and resting upon the partition 19, I place packing 26, and a secondary gland 27 is fitted in the said bore 25 and bears upon the said packing. The secondary gland 27 is provided at its upper end with an annularly expanded head 28 which, like the head 16, is provided with sockets 29 in its periphery to be engaged by a spanner whereby the gland may be turned home.

From the foregoing description, taken in connection with the accompanying drawing, it will be noted that I have provided a plurality of packing bodies which closely hug the plunger rod and may be easily compressed around the same so that leakage of fluid will be prevented, and have also provided a construction whereby a portion of the liquid raised by the pump will be utilized to prevent heating of the plunger rod and of the packing. As the plunger rod reciprocates and liquid is brought from the bottom of the well, the greater portion of the liquid will, of course, be discharged through the outlet of the pump in the usual manner but a portion of the same will rise through the bore 7 and flow through the by-pass within the box 1 into the central chamber 5 of the box. The ball valve 12 will, of course yield upwardly to the inflowing liquid but upon release of the pressure will automatically and instantly engage its seat 11 so that back flow of the liquid will be prevented and it cannot drain through the by-pass. A supply of liquid will thus be maintained in the chamber 5 sufficient to thoroughly lubricate and cool the plunger rod even though, for some reason, the valves at the lower end of the pump should fail to operate and no liquid be raised from the well. The primary and secondary glands furnish means for easily and efficiently compressing the lower packing while the sleeve 21 serves as a baffle to prevent excess liquid adhering to the plunger rod and being wasted. The device is exceedingly simple and may be easily produced and applied to existing pumps at a low cost.

Having thus described the invention, I claim:

1. A stuffing box comprising a body having an attaching shank extending from one end and formed with an axially disposed passage, said body having a chamber formed therein and opening through the upper end of the body and having a packing receiving pocket leading from its bottom and terminating in a reduced opening communicating with the upper end of the shank passage and adapted to receive a shaft extended axially through the chamber and shank passage, said body having a duct formed therein leading from the upper end portion of the shank passage and provided with a side port communicating with said chamber, said passage and its side port being wholly within the body, an upwardly opening check valve in said duct below said side port, a packing gland received in the upper end portion of said chamber for adjustment longitudinally of said body, and a perforated sleeve extending from the inner end of said gland and fitting into said pocket to compress packing therein, said sleeve being of a diameter to dispose its walls in spaced relation to a shaft extended through the stuffing box.

2. A stuffing box comprising a body having an attaching shank extending from one end and formed with an axially disposed passage, said body having a chamber formed therein and opening through the upper end of the body and having a packing receiving pocket leading from its bottom and terminating in a reduced opening communicating with the upper end of the shank passage and adapted to receive a shaft extended axially through the chamber and shank passage, said body having a duct formed therein leading from the upper end portion of the shank passage and provided with a side port communicating with said chamber, said passage and its side port being wholly within the body, an upwardly opening check valve in said duct below said side port, a packing gland received in the upper end portion of said chamber for adjustment longitudinally of said body and having an annular recess formed in its inner end face, packing in said recess, and a perforated sleeve fitted in said recess against said packing and extending through the chamber into said pocket to compress packing therein when the gland is moved inwardly, said sleeve being of a diameter to dispose its walls in spaced relation to a shaft extended through the stuffing box.

3. A stuffing box comprising a body having an attaching shank extending from one end formed with an axially disposed passage extending into the body, said body having a chamber formed therein with a neck opening through the upper end of the body and a packing receiving pocket leading from its bottom and terminating in a reduced opening communicating with the upper end of the passage of said shank and of a diameter to snugly receive a shaft extended axially through the body and shank, said body being formed with a duct leading from the upper end portion of said passage and provided with a side port communicating with said chamber, said passage and its side port being wholly within the body, an upwardly opening check valve in said duct below said side port, a packing gland adjustably mounted in the neck of said chamber for movement into and out of the same and including a packing receiving pocket and means to compress packing therein about the shaft, and a perforated sleeve extending from the inner end of said gland into the pocket in the bottom of said chamber for compressing packing therein about the shaft, said sleeve having an internal diameter sufficient to space the walls of the sleeve from the shaft.

4. A stuffing box comprising a body having a chamber formed therein provided with a threaded neck opening through the upper end of the body, an attaching neck extending from the lower end of said body and having a longitudinally extending passage, a packing receiving pocket leading from the bottom of said chamber axially of the chamber and passage and communicating with the upper end of the passage through a reduced opening of a diameter to receive a shaft to be projected axially through the body and shank, packing in said pocket, a duct leading from the upper end portion of said passage and provided with a side port communicating with said chamber, said passage and its side port being wholly within the body, an upwardly opening check valve in said duct below said side port, a packing gland screwed into the threaded neck of said chamber about the shaft and having a packing receiving pocket, packing in the last-mentioned pocket, means adjustable in the last-mentioned pocket for compressing the packing therein, the inner end of said gland being formed with an annular recess, a perforated tube disposed in said chamber axially thereof and having its upper end fitted in said recess and its lower end extending into the first mentioned pocket and adapted to compress the packing therein when the gland is moved inwardly, and packing between the upper end of said tube and top of said recess, said tube being of a diameter to be disposed in spaced relation to a shaft passed through the stuffing box.

In testimony whereof I affix my signature.

RALPH BURTRON DEEMS. [L. S.]